Patented Mar. 6, 1951

2,544,247

UNITED STATES PATENT OFFICE 2,544,247

ETHYL CELLULOSE AND RESINOUS COMPOSITION

Annis G. Asaff, Auburndale, and William W. Donelson, Plympton, Mass., assignors, by mesne assignments, to Callaghan Hession Corporation, Boston, Mass., a corporation of Massachusetts No Drawing. Application November 3, 1947, Serial No. 783,858

4 Claims. (Cl. 106—173)

The present invention relates to compositions suitable for use as protective or decorative coatings over floors, walls and like surfaces and pertains more particularly to compositions wherein ethyl cellulose is employed as the binder or film forming ingredient.

Ethyl cellulose possesses properties, such as good heat and chemical stability, low capacity for water absorption from moist air or upon immersion, and unusually good dimensional stability, which make it a desirable and relatively inexpensive, plastic film-forming substance. However, it has not heretofore been utilized in compositions suitable for use as protective coatings owing to the fact that such compositions do not possess the working qualities necessary for easy application thereof by brush or trowel in layers of suitable thickness. Ethyl cellulose is soluble in a variety of solvents, such as alcohols, ketones, esters, aromatic hydrocarbons, and combinations of these. For maximum film strength as well as for reasons of economy, the commonly used solvent for ethyl cellulose has been a combination of 70 to 90% of an aromatic hydrocarbon with 30 to 10% of an alcohol. Solvent solutions of ethyl cellulose, wherein the solvent comprises an aromatic hydrocarbon and an alcohol in proportions within the ranges stated are so sticky and lacking in flowable properties as not to be readily brushable or trowelable and especially do not lend themselves for use in making brushable or trowelable flooring or similar coating compositions, particularly when mixed with necessary fillers and other compounding ingredients. In addition to the difficulties arising from their sticky properties, successive coatings cannot be successfully applied because the solvent, acting upon the previous or adjacent layer or coat, breaks the bond between the latter and the surface to which it has been applied.

It is an object of the invention to provide compositions utilizing ethyl cellulose as the film-forming component thereof which will be suitable for application either by brushing or troweling in layers of desired and controllable thickness.

Another object of the invention is to provide compositions of this character which when applied as a film or layer over a surface, such as that of a concrete floor, will dry rapidly to a condition enabling successive layers to be applied thereover within a relatively short period of time.

Still another object of the invention is to provide compositions of the character indicated, containing mineral fillers and other compounding ingredients and which will be suitable for trowel or brush application to a floor or like surface.

Other objects and advantages of the invention will be readily apparent from the more detailed description hereinafter given.

According to the invention, ethyl cellulose, together with suitable fortifying extender and plasticizer, is dissolved in a solvent mixture comprising a major proportion of a lower aliphatic alcohol and a minor proportion of an aromatic hydrocarbon solvent. More specifically, there is employed in accordance with the invention a solvent mixture comprising 60 to 90% alcohol and 40 to 10% aromatic hydrocarbon.

When ethyl cellulose, together with a suitable plasticizer and a fortifying extender, is dissolved in a solvent mixture composed of a major proportion of alcohol and a minor proportion of aromatic hydrocarbon, there is formed a vehicle with which suitable coloring pigments and other fillers may be compounded to produce a composition suitable for use as a protective or decorative coating. The resultant composition, however, while more easily brushable and trowelable in successive coats than when the major proportion of solvents consists of aromatic hydrocarbon, nevertheless still does not possess the qualities necessary for the spreading of the material as by means of a brush or trowel in a smooth, uniform layer, and in successive layers or coats. We have found, however, that such quality can be imparted to the composition by incorporating therein a small amount of water. The amount of water added for this purpose should be sufficient to inactivate, to a substantial degree, the solvent effect of the alcohol upon the ethyl cellulose film-forming substance but should be less than that which would cause total inactivation of the solvent action of the alcohol such as would bring about precipitation of the ethyl cellulose to an extent which would destroy the cohesiveness of the material. In general, the amount of water required for this purpose will be within the range of 5 to 10% by weight of the vehicle component. However, since the normal grades of industrial alcohol, which would be used as the alcohol component of the vehicle, may contain as much as 5% of water, the admixture of such alcohol with the aromatic hydrocarbon solvent, in proportions above stated, will provide about 3 to 4% of water in the vehicle. Hence, in order to impart to such vehicle the property of brushability and trowelability above referred to, additional quantities of water in the amount of say 2 to 6% by weight of the vehicle are necessary.

Referring more in detail to compositions embodying the invention, there may be employed ethyl cellulose having a viscosity of 20 to 100 centipoises as determined by viscosity measurement of a 5% solution in an 80% toluol-20% ethanol solvent. In actual practice, we have employed ethyl cellulose of the type having an ethoxyl content of 46.8–48.5%, mixing equal parts of the grade having a viscosity of about 22 centipoises with one having a viscosity of about 100 centipoises. For compositions in which greater resistance to oil and to chemicals is necessary, we have employed ethyl cellulose of the type whose ethoxyl content is 44.5–45.5% and having a viscosity of about 20 centipoises.

As fortifying extenders for the ethyl cellulose, there may be employed any one of a variety of materials capable of toughening the ethyl cellulose film and having solubility characteristics similar to those of the ethyl cellulose and which are compatible with the particular plasticizer to be employed. One material suitable as the extender comprises a petroleum hydrocarbon-insoluble resin sold under the trade name "Vinsol" and obtained as a hard, high melting point, dark-colored resinous material, low in abietic acid, after separation of refined rosin from resinous material extracted from pine wood with a solvent as described, for example, in U. S. patent of Hall 2,193,026. In lieu of this resin, partially polymerized rosin may be employed. Where resistance to the action of alkali and other chemicals is of importance, ester gum, lime-treated rosin, or commercially available grades of zinc resinate made by reacting zinc oxide with polymerized rosin, may be employed.

As plasticizer for the ethyl cellulose, there may be employed tricresyl phosphate, triphenyl phosphate, tribenzyl phosphate, butyl stearate, dihydro methyl abietate, chlorinated diphenyl or suitable equivalent combinations thereof. When chlorinated diphenyl is used, the preferred material is the grade having a pour point (ASTM) of 8.0 to 12.0° C., a distillation range (ASTM) of 365 to 390° C., a specific gravity of 1.495 to 1.505, and a viscosity (Saybolt seconds) of 42 to 45 at 98.9° C.

As the alcohol component of the solvent mixture for dissolving the ethyl cellulose and the selected extender and plasticizer therefor, there may be employed any lower aliphatic alcohol miscible with water, but more particularly ethyl alcohol, propyl or isopropyl alcohol. In actual practice there may be employed the common industrial grades of ethyl alcohol or suitable mixtures thereof with isopropyl alcohol.

As the aromatic hydrocarbon component of the solvent mixture, there may be employed either benzol, toluol or xylol. It is preferable to employ xylol as the aromatic hydrocarbon because of its higher boiling point.

The following example is illustrative of a solvent solution of ethyl cellulose, a plasticizer and an extender therefor, which may be employed as a vehicle for the production of coating compositions in accordance with the invention.

*Example I*

| | | |
|---|---|---|
| Ethyl cellulose (46.8 to 48.5% ethoxyl; 22 cp. viscosity) | pounds | 20 |
| Ethyl cellulose (46.8 to 48.5% ethoxyl; 100 cp. viscosity) | pounds | 20 |
| Vinsol | do | 40 |
| Liquid chlorinated diphenyl | do | 20 |
| Industrial alcohol | gallons | 15 |
| Isopropyl alcohol | do | 15 |
| Xylol | do | 12 |

In making up the vehicle according to the formula of this example, the chlorinated diphenyl is preferably first dissolved in the xylol and to this solution there may then be added the industrial alcohol and the isopropyl alcohol, either separately or as a pre-formed mixture thereof. In most cases it will be desirable to withhold a small portion of the alcohol for subsequent addition to the solution after the ethyl cellulose has been incorporated. To the solution of the chlorinated diphenyl in the alcohol-xylol mixture, there is then added, gradually and with slight agitation, the ethyl cellulose. After the latter has been substantially all dissolved in the solvent mixture, the extender resin is then similarly incorporated until dissolved, whereupon the withheld portion of the alcohol is incorporated. It is preferable that the operation of dissolving the ethyl cellulose, plasticizer and extender in the solvent mixture be carried on at a temperature not substantially below about 80° F., for if the temperature is considerably below 80° F., the dissolving time is very materially increased.

In the above example, it will be noted the ethyl cellulose is made up of a mixture of equal parts of a grade having a viscosity of 22 cp. with one having a viscosity of 100 cp. The combination of these two grades, both of which are commercially available, provides ethyl cellulose of about 60 cp. viscosity. It will be understood that other grades of ethyl cellulose having about this order of viscosity may be employed in lieu of the mixture referred to.

In accordance with the invention, the solvent solution made as above described may be employed as a vehicle for brushable or trowelable coatings by combining suitable pigments and/or fillers therewith.

In order to prepare such a coating composition, suitable for use as a flooring, the above described vehicle may be mixed with sand or other mineral aggregate of suitable grading, pigment and filler.

Although the composition, upon elimination of the solvent component, provides a highly desirable durable coating for a floor surface or the like, it does not lend itself to application in films of uniform thickness and required smoothness by means of a trowel or brush, for the reasons above set forth. We have found, however, that the composition can be modified so as to impart thereto properties enabling the same to be brushed or troweled readily in successive layers, by adding thereto a small amount of water. By virtue of the miscibility of the water with the alcohol component of the solvent and its immiscibility with the aromatic hydrocarbon component thereof, partial inactivation of the solvent effect of the alcohol on the ethyl cellulose occurs. The amount of water, however, must be held well below that which would cause substantially complete release of the alcohol so as to destroy the cohesiveness of the material. In general, the presence of from about 5% to about 10% of water in the composition, based on the weight of the vehicle component thereof, will suffice to accomplish this result.

Suitable floor coating compositions embodying the invention may be made by mixing, in suitable mixing equipment 24 to 28 pounds, preferably 26 pounds, of the above described vehicle, 16 to 20 pounds, preferably 18 pounds, of fine beach sand (graded to pass a 48 mesh screen and be retained on a 100 mesh screen), 1 to 2 pounds of wood flour, 2 to 3 pounds of iron oxide and 1 pound of water. In preparing this flooring composition, the sand, pigment and wood flour are first incorporated in the vehicle and distributed uniformly therein and thereupon the water is incorporated. If desired, however, the water may be combined with the vehicle before incorporating the aggregate, pigment and filler. In a mixture comprising the vehicle and compounding ingredients (viz., aggregate, filler and pigment) above mentioned in the proportions stated, we have found that the incorporation of 1 pound of water, viz., about 3.9% by weight of vehicle portion of the mixture, is sufficient to bring the composition to a readily flowable, non-tacky consistency, such that it may readily be manipulated with a trowel without adhering to the surface of the trowel as would otherwise be the case. At the same time, the nature and relative proportions of the solvent components is such to enable the applied layer of the composition to dry and harden rapidly (usually within a period of about one hour) to an extent which permits additional layers of the same coating to be applied thereover, if it be desired to build up a layer of greater thickness than that provided by a single coat. Depending primarily upon the grading of the aggregate, thicknesses of, say, one-half inch, may be built up by using as little as two or three trowel coats.

It will be understood, of course, that in compounding a flooring composition such as above described, other pigments may be substituted for the iron oxide; likewise, organic material such as cork granules may be used as the aggregate and mineral fiber may be used in lieu of wood flour.

Since the thickness as well as the smoothness and surface appearance of the coating are governed largely by the grading of the sand or other material used as the aggregate, a wear-resistant finish coating may be provided by mixing the same vehicle as above described with finely divided filler and with water in the amounts indicated. Illustrative of such a finish coating embodying the invention is a mixture comprising 26 pounds of the vehicle, 5 pounds of silica sand graded to pass 100 mesh and be retained on 200 mesh, 1 to 2 pounds of pigment, 1 pound of No. 100 mica and 1 pound of water.

For the production of a brushable coating useful as a paint, the vehicle above described may be combined with the required amount of pigment and water to provide a composition containing 5 to 10% water based on the weight of the vehicle.

In compounding the compositions above described, it may be desirable, in using certain pigments, first to grind the pigment in an ordinary paint mill with sufficient quantity of the vehicle to make a stiff paste for incorporation in the major portion of the vehicle, along with the aggregate, or fillers used.

The following example, illustrates a vehicle for use in preparing coating compositions exhibiting greater resistance to oil and to chemicals, such as alkalies, soaps, etc. than compositions made from the vehicle of Example I.

*Vehicle*

| | |
|---|---|
| Ethyl cellulose (44.5 to 45.8% ethoxyl; 22 cp. viscosity) pounds | 40 |
| Ester gum do | 40 |
| Liquid chlorinated diphenyl do | 20 |
| Industrial alcohol gallons | 15 |
| Isopropyl alcohol do | 15 |
| Xylol do | 12 |

This vehicle may be compounded in the manner above described with mineral filler and pigment in the proportions of 26 pounds of the vehicle, 18 pounds of beach sand (graded to pass a 48 mesh screen and be retained on a 100 mesh screen) 3 pounds of silica sand (graded to pass 100 mesh and be retained on 200 mesh) and 1 to 2 pounds of mineral pigment. One pound of water is incorporated in the mixture in order to render it readily trowelable. Similarly, the vehicle may be formed into a composition suitable for use as a wear-resistant finish coat by combining say 26 pounds of the vehicle with 4 to 5 pounds of silex (graded to pass 100 mesh and be retained on 200 mesh), 1 pound of suitable pigment and about 1 pound of water; or the vehicle may be combined with suitable pigment and water in proportions indicated, for the production of a brushable paint. A conductive wear resistant floor coating composition may be formed from the vehicle by combining the same with ground coke in the proportions of say 25 pounds of the vehicle and say 9 pounds of coke of 48 mesh or say 7 pounds of coke of 100 mesh, and incorporating water in an amount to furnish 5 to 10% by weight based on the weight of the vehicle content.

It will be understood that the compositions hereinabove referred to as finish coatings may be applied over previously applied layers of the compositions containing the coarser grades of aggregate serving as a base coat and that such finish coats may likewise be used over other suitable coatings on floors or the like.

While the products herein-described are considered to be preferred embodiments of the invention, it is to be understood that the invention is not limited to these precise products, and that changes may be made therein without departing from the scope of the invention as defined in the appended claims.

We claim:

1. A plastic coating composition comprising a vehicle, said vehicle comprising ethyl cellulose, an alcohol-soluble resinous fortifying extender derived from rosin and a plasticizer dissolved in a solvent composed of 60 to 90 per cent by weight of low boiling aliphatic alcohol and 40 to 10 per cent by weight of an aromatic hydrocarbon, said composition also containing water in an amount from 5% to 10% by weight, based on the weight of the vehicle, the water partially inactivating the solvent effect of the alcohol upon the ethyl cellulose without causing substantial precipitation of the ethyl cellulose and thereby rendering the composition capable of being spread by means of a trowel.

2. A composition as defined in claim 1, wherein the water includes 2 to 6% of water, based on the weight of the vehicle component, in addition to the water content of the alcohol component.

3. A composition as defined in claim 1, wherein said solvent is composed of 70% of the alcohol and 30% of the aromatic hydrocarbon.

4. A composition as defined in claim 1, wherein said solvent comprises 60 to 90% of an alcohol selected from the group consisting of ethyl alcohol, propyl alcohol and isopropyl alcohol, and 40 to 10% of an aromatic hydrocarbon selected from the group consisting of benzol, toluol and xylol.

ANNIS G. ASAFF.
WILLIAM W. DONELSON.

REFERENCES CITED

The following references are of record in the file of this patent:

UNITED STATES PATENTS

| Number | Name | Date |
|---|---|---|
| 1,518,417 | Stinchfield | Dec. 9, 1924 |
| 2,064,608 | Hucks | Dec. 15, 1936 |
| 2,082,592 | Nollau | June 1, 1937 |
| 2,113,305 | Malm et al. | Apr. 5, 1938 |

FOREIGN PATENTS

| Number | Country | Date |
|---|---|---|
| 102,082 | Australia | Sept. 30, 1937 |
| 279,520 | Great Britain | Jan. 25, 1929 |
| 334,567 | Great Britain | Sept. 8, 1930 |